UNITED STATES PATENT OFFICE.

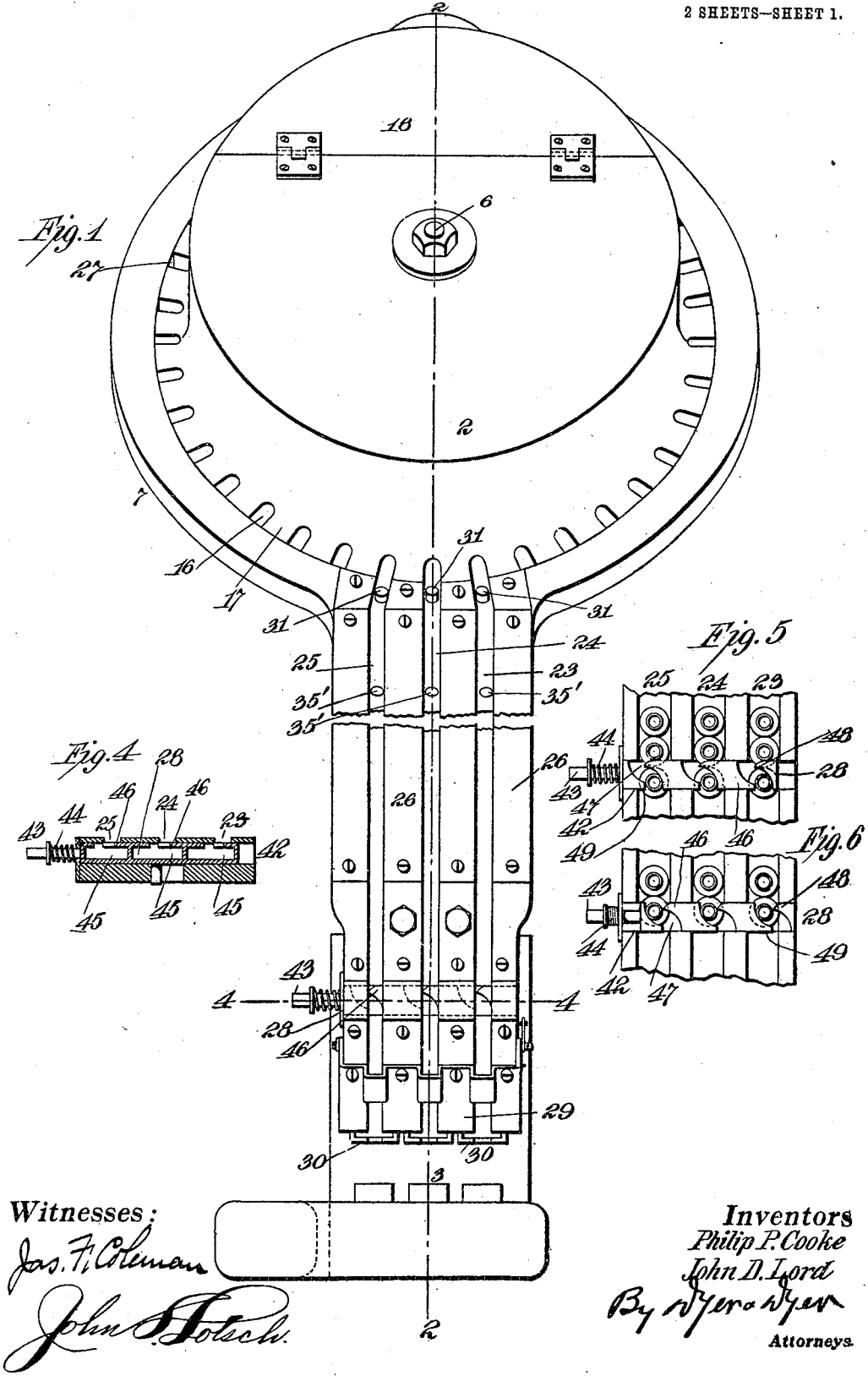

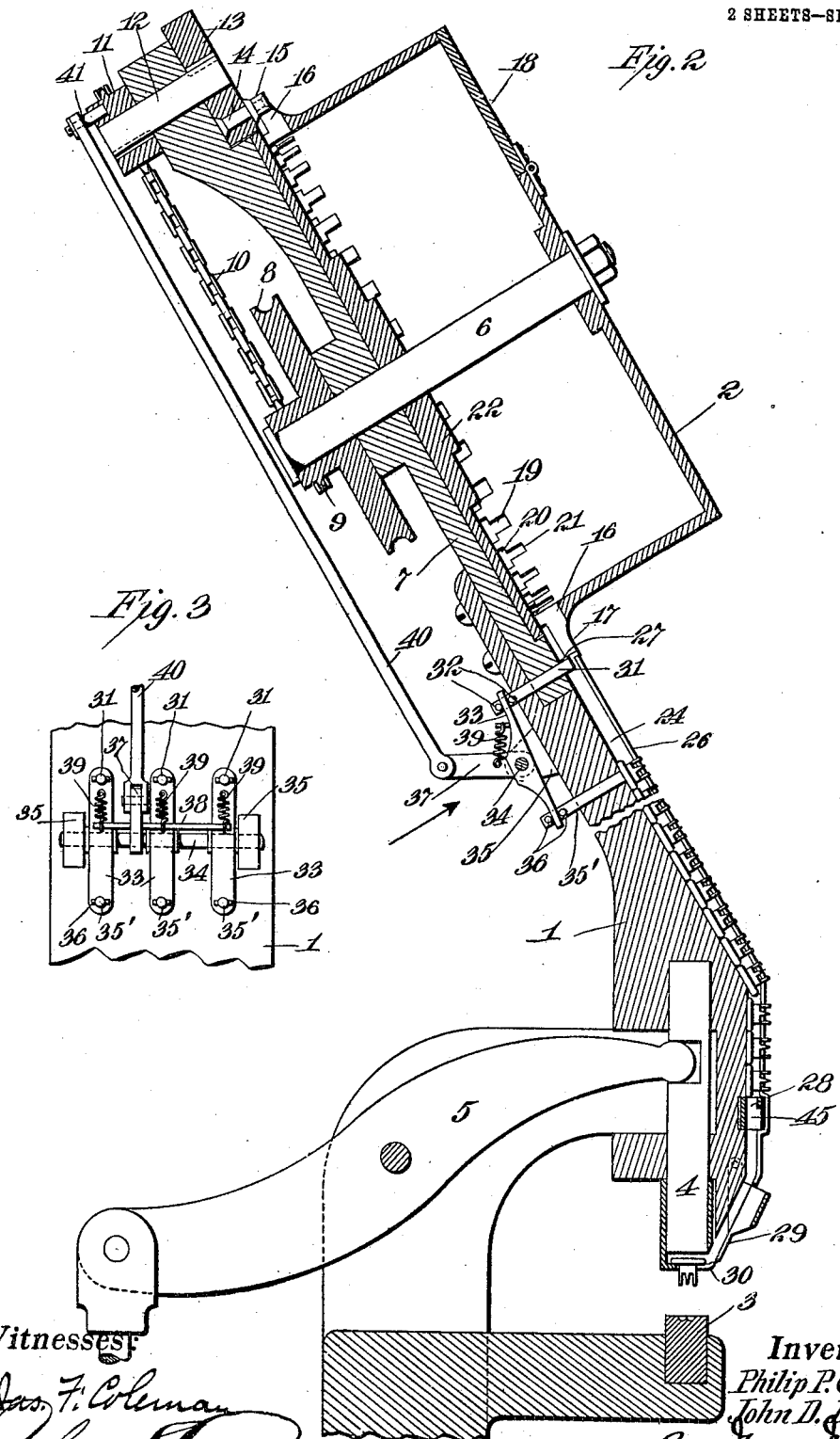

PHILIP P. COOKE AND JOHN D. LORD, OF JERSEY CITY, NEW JERSEY, ASSIGNORS TO HALL BUTTON COMPANY, OF JERSEY CITY, NEW JERSEY, A CORPORATION OF NEW YORK.

MACHINE FOR ATTACHING BUTTONS.

No. 837,667.  Specification of Letters Patent.  Patented Dec. 4, 1906.

Application filed August 23, 1904. Serial No. 221,831.

*To all whom it may concern:*

Be it known that we, PHILIP P. COOKE and JOHN D. LORD, citizens of the United States, and residents of Jersey City, in the county of Hudson, State of New Jersey, have invented certain new and useful Improvements in Machines for Attaching Buttons, of which the following is a specification.

The objects we have in view are to provide a machine for simultaneously applying a plurality of buttons to articles of clothing.

A machine which we have designed and which forms the specific embodiment of this application for patent is intended to apply the three buttons to the lower part of the leg of short trousers, such buttons being for ornamental purposes. The buttons employed are of metal and have each an integral pronged shank which is passed through the cloth and clenched.

The accompanying drawings illustrate a machine for attaining the objects of the invention.

Figure 1 represents a front view of the operative parts of the machine. Fig. 2 is a vertical section thereof, taken on the lines 2 2 of Fig. 1. Fig. 3 is a rear view of a portion of the cut-out mechanism as appears in Fig. 2, the reader looking in the direction of the arrow. Fig. 4 is a sectional view of the gate, taken on the lines 4 4 of Fig. 1. Figs. 5 and 6 are front views of the gate, showing it in different operative positions.

In all of the several views like parts are designated by the same reference-numerals.

The machine comprises a main support 1, which carries a button-hopper 2, so mounted as to revolve thereon. An anvil 3 and a riveting-plunger 4, the latter actuated by the ordinary mechanism, which includes a lever 5, is provided. The plunger 4 is actuated, preferably, by means of connections actuated by a clutch contained in the base of the machine. The mechanism which accomplishes this is too well known to require detailed explanation or illustration.

The hopper 2 is in the form of a circular box and is supported upon an inclined shaft 6, which is free to turn within a bearing formed in a plate 7, attached to the upper part of the frame 1. The hopper 2 is rotated intermittently by the following mechanism: Upon the shaft 6 is journaled a pulley 8, which is continuously rotated by means of a belt. (Not shown.) Connected to the pulley is a sprocket-wheel 9, which engages with a chain belt 10, which imparts motion to a pinion 11. This pinion is keyed to a shaft 12, journaled in the plate 7 and having its other extremity keyed to a disk 13. The disk 13 carries a pin or stud 14, eccentrically arranged, and which is provided with a friction-roller 15. This roller is adapted to successively engage with notches 16, cut within a flange 17 on the hopper 2. By this mechanism the hopper will be intermittently rotated the distance of one notch 16 through every revolution of the shaft 12.

The hinged cover 18 allows access to the hopper 2 and owing to the inclination of the latter will require no latch or other fastening. The buttons pass out through openings 19, cut on the lower edge of the sides of the hopper, and into the notches 16, with which they communicate. These openings extend around the entire periphery of the hopper, and each opening has an enlarged base 20 for the passage of the body of the button and a restricted portion 21 for the passage of the shank, the opening being of this shape so that the buttons can pass through only when in the proper position, as shown in Fig. 1. The bottom of the hopper and the lower edge of the openings 19 are inclosed by the plate 22, which is connected to the sides of the hopper.

Three chutes 23 24 25 are cut within the frame 1 and the plate 7 up to the periphery of the flange 17, and these grooves are partially closed by plates 26, forming narrow slots, through which the shanks protrude and which retain the buttons in place. The plate 7 is provided with a recess having a square shoulder 27, within which the plate 22 and flange 17 rest and which forms a closure for the notches 16, except where it is cut by the upper extremities of the chutes, so that buttons will not escape through the openings 19 except when the latter are immediately over one of the chutes 23, 24, and 25. From the openings 19 the buttons pass down the chutes and rest upon a gate which is near to the plunger 4. This gate is normally kept closed, but may be opened and a button in each of the three slots simultaneously released, so that they will pass down the hinged portion 29 and rest upon the clips 30 (the latter carried by the plunger) in such position that they may be applied to the cloth and clenched upon the anvil.

The rotating mechanism for the hopper is constantly in operation, so that in the event of the buttons being fed to the chute 23 24 25 more rapidly than they are applied to the clothing, means must be provided to prevent an excess of buttons being fed to the chutes, and choking of the apparatus thereby prevented. In order to provide an automatic cut-off, the following mechanism is provided, which constitutes a cut-off device: Within each of the chutes 23 24 25 is provided a cut-off plunger 31. This plunger passes through an opening in the frame 1 and plate 7 and is located sufficiently close to the periphery of the flange 17 to close the notch 16 immediately above the chute. The projecting portion of each of the plungers behind the plate is provided with pins 32, between which plays a lever 33. The three levers 33 are loosely mounted upon a shaft 34, which is mounted on standards 35. The other end of each of the levers 33 is perforated, and a pin 35' passes through the perforation, this pin also having small pins 36 thereon to limit the movement of the lever 34. The plungers 35' are parallel to the pins 31, and each of the pins passes through an opening in the frame 1 at the bottom of one of the chutes 23 24 25. A lever 37 is journaled upon the shaft 34 and is provided with an arm 38, which extends over the three levers 33 and is connected to each by means of a spiral spring 39 39 39. The lever 37 is oscillated by means of a link 40, connected to a pin 41, eccentrically mounted on the pinion 11. The operation of this part of the mechanism is as follows: At each revolution of the pinion 11 the link 40 will be depressed, and with it the lever 37 and cross-bar 38. This will put a tension upon the springs 39 and will ordinarily oscillate each of the levers 33, depressing the plungers 31 and allowing a button to pass through the three notches 17 immediately above the chutes 23 24 25 and enter these chutes. At the time the plungers 31 are being depressed the pins 35' will be elevated. Should one of the chutes 23 24 25 contain an accumulation of buttons as high up in the chute as is shown in Fig. 2, the pin 35' in that chute will engage with the uppermost of such buttons and prevent the lever 33 being oscillated and the plunger 31 from being depressed. The spring 39 will form an elastic connection and will be extended without oscillating the lever 33. The other two levers, however, will be oscillated, their pins 35' not being locked. A button within the notch 17 will therefore not be free to enter a chute which is so closed. Upon another revolution of the pinion 11 and another partial revolution of the hopper 2 the button can pass into the next chute 24 or 25 unless such chute is filled with buttons. If all of the chutes are filled, the button will engage with the shoulder 27 until that particular notch reaches the upper part of the machine, when the button will drop back into the hopper.

The cut-off gate 28 is mounted within a slot 42 and is provided with a finger-piece 43 and a spiral spring 44, which keeps it normally closed, or in the position shown in Fig. 5. The gate comprises a body which is provided with three channels 45, each of such channels having an enlarged portion for the passage of the body of the button and a restricted portion for engagement with the shanks. The restricted portions are cut in the front 46 of the gate and are in the form of curved slots 47. Each slot is provided at the top with a projecting portion 48, which when the gate is closed engages with the shank of the button immediately above it. Upon the gate being opened by pressure being applied to the finger-piece 43 and moved in the position shown in Fig. 6 the projecting portion 48 will be moved past the shank of the button, and the latter will be free to enter the slot 47. It will be prevented from descending, however, by a projection 49, formed at the bottom of the gate, which will engage with the shank of the button and hold it immovable until the gate is again closed, as shown in Fig. 5. The button will be free to drop down the chute and will rest upon the clips 30. By this gate we provide means for simultaneously releasing three buttons and allowing them to be introduced in place immediately above the anvil.

In the ordinary form of button-applying machine for attaching a single button at a time the receptacle is provided with no bottom, but bears against a fixed plate, which is cut away at the upper part. The single fixed chute which catches the buttons as they pass through the opening in the receptacle does not, as in our machine, connect directly with the periphery of the receptacle, but through a canal or channel which passes around one side of the periphery of the receptacle and engages with the cut-away portion of the fixed plate. The receptacle instead of being moved one step at a time, as in our machine, is moved more rapidly, and buttons are free to pass through the slots into the channel, where they will successively drop down the chute. Should the buttons be fed too fast in the chute, they will accumulate in the channel until the latter is filled, the excess passing into the receptacle by way of the cut-away portion. Should a button stick in the upper part of the chute, as it frequently does in practice, it is carried around by the receptacle and, engaging with the button immediately above it in the channel, will lift all of the buttons which are above it in the channel and pass them through the cut-away portion back into the receptacle. This arrangement cannot be used with a plurality of chutes, for the reason that if the chutes are curved one or more of them would have to be so high on the periphery of the receptacle that the buttons could not pass by gravity through the openings in the receptacle and into this chute. For this reason it is necessary to make the chutes straight and to omit the curved parts. If a channel or canal were provided to prevent choking and other injurious results from overflow, as with the single chute, choking would nevertheless occur, owing to the fact that the chutes are not curved at their upper edges, where they engage with the receptacle. Therefore in order to make the machine operative a cut-off device has to be provided to prevent the overflow of the chutes from choking the machine, and in order to allow the chutes to be filled the receptacle has to be turned step by step, so that the openings in the receptacle will always register with the inlets to the chutes.

Our invention can be applied to machines for attaching a greater number of buttons than that illustrated by adding additional chutes and extending the cut-off device and gate mechanism correspondingly.

Having thus described our invention, what we claim, and desire to secure by Letters Patent, is—

1. In a machine for attaching buttons, the combination with a rotary receptacle, openings in the periphery thereof, a plurality of chutes adjacent to the openings, and means for automatically cutting off the supply of buttons from the receptacle to any one of the chutes, substantially as set forth.

2. In a machine for applying buttons, the combination with a member having a plurality of chutes therein, a rotary receptacle having openings in its periphery, means for intermittently rotating the receptacle to cause the openings to successively engage with the upper extremities of the chutes, and an automatic cut-off device for preventing ingress of buttons to a chute such cut-off being controlled by the buttons within the chute, substantially as set forth.

3. In a machine for applying buttons, the combination with a member having a plurality of chutes, of a rotary receptacle having openings in its periphery, means for intermittently rotating the receptacle, a cut-off device for limiting the supply of buttons for each chute, the said cut-off having an operative and an inoperative position and means for intermittently actuating the cut-off device to move it from an inoperative to an operative position when the chutes are filled, substantially as set forth.

4. In a machine for attaching buttons, the combination with a rotary receptacle, and a chute, means for rotating the receptacle, a cut-off device within the chute, the said cut-off having an operative and an inoperative position, driving connections between the rotating means and the cut-off device and means permitting the driving connections to operate when the cut-off is inoperative, substantially as set forth.

5. In a machine for attaching buttons, the combination of a rotary receptacle and a chute, of means for rotating the receptacle, a cut-off device within the chute, means for driving the cut-off device from the rotary receptacle, and elastic connections between the driving means and the cut-off.

6. In a machine for attaching buttons, the combination of a rotary receptacle, a plurality of chutes and means for rotating the receptacle, of a cut-off device within each chute, means for driving the cut-off devices from the rotating receptacle, such means being elastically connected to the cut-offs allowing one or all of the cut-offs to be stopped without interfering with the movements of the rotating receptacle.

7. In a machine for attaching buttons, the combination with a rotary receptacle, and a plurality of chutes, the said receptacle having openings on its periphery, the said openings passing by the revolution of the receptacle immediately over the inlets to the chutes, and means for intermittently rotating the receptacle to cause an opening to be successively over the chutes, and an automatic cut-off device for closing communication from the openings to the filled chutes, substantially as set forth.

8. In a machine for attaching buttons, the combination with a rotary receptacle, and a plurality of chutes, the said receptacle having openings on its periphery, the said openings passing by the revolution of the receptacle immediately over the inlets to the chutes, and means for intermittently rotating the receptacle to cause an opening to be successively over the chutes, a cut-off device for closing communication from the openings to the chutes, the said cut-off devices being controlled by buttons within a chute, substantially as set forth.

This specification signed and witnessed this 17th day of August, 1904.

PHILIP P. COOKE.
JOHN D. LORD.

Witnesses:
JAMES SKINNER, Jr.,
GEO. W. LEACH.